(12) United States Patent
Su et al.

(10) Patent No.: US 12,597,246 B2
(45) Date of Patent: Apr. 7, 2026

(54) METHOD AND APPARATUS FOR GENERATING ADVERSARIAL PATCH

(71) Applicants: Robert Bosch GmbH, Stuttgart (DE); TSINGHUA UNIVERSITY, Beijing (CN)

(72) Inventors: Hang Su, Beijing (CN); Yichi Zhang, Beijing (CN); Xinxin Gu, Shanghai (CN); Ze Cheng, Shanghai (CN); Yunjia Wang, Shanghai (CN); Zijian Zhu, Beijing (CN)

(73) Assignees: ROBERT BOSCH GMBH, Stuttgart (DE); TSINGHUA UNIVERSITY, Beijing (CN)

( * ) Notice: Subject to any disclaimer, the term of this patent is extended or adjusted under 35 U.S.C. 154(b) by 171 days.

(21) Appl. No.: 18/554,498

(22) PCT Filed: Apr. 22, 2021

(86) PCT No.: PCT/CN2021/088875
§ 371 (c)(1),
(2) Date: Oct. 9, 2023

(87) PCT Pub. No.: WO2022/222087
PCT Pub. Date: Oct. 27, 2022

(65) Prior Publication Data
US 2024/0193931 A1 Jun. 13, 2024

(51) Int. Cl.
| | |
|---|---|
| *G06V 10/82* | (2022.01) |
| *G06T 11/00* | (2026.01) |
| *G06V 10/26* | (2022.01) |
| *G06V 10/776* | (2022.01) |

(52) U.S. Cl.
CPC ............ *G06V 10/82* (2022.01); *G06T 11/001* (2013.01); *G06V 10/267* (2022.01); *G06T 2210/12* (2013.01); *G06V 10/776* (2022.01)

(58) Field of Classification Search
CPC .... G06V 10/82; G06V 10/267; G06V 10/776; G06V 20/58; G06T 11/001; G06T 2210/12; G06F 18/214; G06F 18/24133; G06N 3/045; G06N 3/084
See application file for complete search history.

(56) References Cited

U.S. PATENT DOCUMENTS

| | | | | |
|---|---|---|---|---|
| 10,783,401 | B1 * | 9/2020 | Jiang | G06N 3/086 |
| 2021/0064938 | A1 * | 3/2021 | Ahuja | G06V 10/764 |

OTHER PUBLICATIONS

Yang et al. "PatchAttack: A Black-box Texture-based Attack with Reinforcement Learning", https://arxiv.org/abs/2004.05682v2 (Year: 2020).*

(Continued)

*Primary Examiner* — Kee M Tung
*Assistant Examiner* — Xiaoming Wei
(74) *Attorney, Agent, or Firm* — NORTON ROSE FULBRIGHT US LLP

(57) ABSTRACT

A method for generating a set of adversarial patches for an image. The method includes segmenting the image into a plurality of regions; selecting a set of target regions that satisfies an attacking criterion by discretely searching of the plurality of regions; and generating a set of adversarial patches by using the set of target regions.

14 Claims, 4 Drawing Sheets

(56) References Cited

OTHER PUBLICATIONS

Thys et al. "Fooling automated surveillance cameras: adversarial patches to attack person detection", https://arxiv.org/abs/1904.08653v1 (Year: 2019).*

M. N. Vijayalakshmi and M. Senthilvadivu, "Performance evaluation of object detection techniques for object detection," 2016 International Conference on Inventive Computation Technologies (ICICT), Coimbatore, India, 2016, pp. 1-6, doi: 10.1109/INVENTIVE.2016.7830065. (Year: 2016).*

X. Dong et al., "Robust Superpixel-Guided Attentional Adversarial Attack," 2020 IEEE/CVF Conference on Computer Vision and Pattern Recognition (CVPR), Seattle, WA, USA, 2020, pp. 12892-12901, doi: 10.1109/CVPR42600.2020.01291. (Year: 2020).*

Tom B. Brown, Dandelion Mané, Aurko Roy, Martín Abadi, Justin Gilmer, "Adversarial Patch", https://arxiv.org/abs/1712.09665v2 (Year: 2018).*

Wang, Yaxiong & Wei, Yunchao & Qian, Xueming & Zhu, Li & Yang, Yi. (2021). AlNet: Association Implantation for Superpixel Segmentation. Jan. 26, 2021, arXiv:2101.10696v1 (Year: 2021).*

International Search Report for PCT/CN2021/088875, Issued Oct. 20, 2021.

Zhao et al., "Object Hider: Adversarial Patch Attack Against Object Detectors," Proceedings of the Cikm Analyticup, 2020, pp. 24-27. <https://ceur-ws.org/Vol-2881/paper7.pdf> Downloaded Oct. 6, 2023.

Liu et al., "Perceptual-Sensitive Gan for Generating Adversarial Patches," The Thirty-Third AAAI Conference On Artificial Intelligence (AAAI-19), vol. 33, 2019, pp. 1028-1035. <https://sci-hub.ru/10.1609/aaai.v33i01.33011028> Downloaded Oct. 6, 2023.

Rao et al., "Adversarial Training Against Location-Optimized Adversarial Patches," Computer Vision—ECCV 2020 Workshops: Glasgow, UK, Proceedings, Part V, 2020, pp. 1-18. <https://www.researchgate.net/publication/348901237_Adversarial_Training_Against_Location-Optimized_Adversarial_Patches> Downloaded Oct. 6, 2023.

ArXiv:2010.14974v1, Yusheng Zhao, et al.: "Object Hider: Adversarial Patch Attach Against Object Detectors." Jun. 3-5, 2018, Woodstock, NY, Copyright 2020, Association for Computing Machinery.

* cited by examiner

110

120

125

210

220

225

600

910

920

700 receive input input, ground truth label, initial value of distribution parameter, and population size    710 initialize superpixels
720 draw sample of selection vector
730 i readches K?
NO
740
YES calculate search gradient and update distribution parameter      750 stopping criteria satisfied?
760
NO

YES generate adversarial patchs and generate attack image
770

800 memory
810 processor
820

METHOD AND APPARATUS FOR GENERATING ADVERSARIAL PATCH

FIELD

The present invention relates generally to computer vision techniques, and more particularly, to techniques of generating an adversarial patch-based image for a computer vision neural network.

BACKGROUND INFORMATION

Nowadays, computer vision techniques are widely applied in various scenarios like surveillance, auto-driving, and so on. Deep learning models, especially those based on convolutional neural network (CNN), have been successfully used in the computer vision techniques. However, recent researches have shown that deep neural networks (DNNs) are vulnerable to adversarial attacks. The vulnerability of DNN-based computer vision techniques has brought huge potential safety risks to scenarios like auto-driving, which makes it necessary to study the adversarial attacks towards a computer vision neural network.

Perturbation-based attack and patch-based attack are two types of mainstream attack methods. Perturbation-based method is based on small perturbations and learns full-image additive noise which can affect the prediction of deep learning models with perturbations that are nearly imperceptible to humans. Since this method manipulates every pixel of an image, it is not feasible for attack in physical world. Patch-based method uses one or more adversarial patches to attack certain parts of an image and produce patch-level changes on the image. Since the patch-based attack only change one or several regions of the image, it has the potential to occur in physical world, like hiding a person or a stop sign, which is dangerous for auto-driving.

Therefore, patch-based adversarial attacks worth more researches in order to study the vulnerability of a computer vision neural network to physical attacks and improve the safety of the computer vision neural network correspondingly.

SUMMARY

The following presents a simplified summary of one or more aspects according to the present includes in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the present invention, a method for generating a set of adversarial patches for an image is provided. According to an example embodiment of the present invention, the method may comprise segmenting the image into a plurality of regions; selecting a set of target regions that satisfies an attacking criterion by discretely searching of the plurality of regions; and generating a set of adversarial patches by using the set of target regions.

In another aspect of the present invention, an apparatus for generating a set of adversarial patches for an image is provided. According to an example embodiment of the present invention, the apparatus may comprise a memory and at least one processor coupled to the memory. The at least one processor may be configured to segment the image into a plurality of regions; select a set of target regions that satisfies an attacking criterion by discretely searching of the plurality of regions; and generate a set of adversarial patches by using the set of target regions.

In another aspect of the present invention, a computer readable medium storing computer code for generating a set of adversarial patches for an image is provided. According to an example embodiment of the present invention, the computer code when executed by a processor may cause the processor to segment the image into a plurality of regions; select a set of target regions that satisfies an attacking criterion by discretely searching of the plurality of regions; and generate a set of adversarial patches by using the set of target regions.

In another aspect of the present invention, a computer program product for generating a set of adversarial patches for an image is provided. According to an example embodiment of the present invention, the computer program product may comprise processor executable computer code for segmenting the image into a plurality of regions; selecting a set of target regions that satisfies an attacking criterion by discretely searching of the plurality of regions; and generating a set of adversarial patches by using the set of target regions.

Other aspects or variations of the present invention will become apparent by consideration of the following detailed description and the figures.

BRIEF DESCRIPTION OF THE DRAWINGS

The following figures depict various embodiments of the present invention for purposes of illustration only. One skilled in the art will readily recognize from the following description that alternative embodiments of the methods and structures disclosed herein may be implemented without departing from the spirit and principles of the present invention described herein.

DETAILED DESCRIPTION OF EXAMPLE EMBODIMENTS

Before any embodiments of the present disclosure are explained in detail, it is to be understood that the disclosure is not limited in its application to the details of construction and the arrangement of features set forth in the following description. The disclosure is capable of other embodiments and of being practiced or of being carried out in various ways.

Object detection is one type of computer vision tasks, which deals with identifying and locating object of certain classes in an image. The present disclosure will be described by taking object detection as an example, while it should be noted that the present disclosure may be applied to other computer vision neural networks which may provide various types of prediction based on an input image.

Deep neural network has been applied in object detection and achieved great success. Object detectors with deep neural network, especially based on convolutional neural network, may be classified into one-stage detectors and two-stage detectors.

For two-stage detectors, their prediction consists region proposals and classification afterwards. The first detector with deep neural network was OverFeat, which combines a sliding window and a convolutional neural network (CNN) to do the detection. After that, Regions with Convolutional Neural Networks (R-CNN) was proposed. The two-stage detectors first search for region proposals and then classify each of them. One problem of R-CNN is that it runs too slow. Therefore, some modern detectors like Fast R-CNN, Faster R-CNN and Mask R-CNN have been proposed to speed up.

Figure 1:
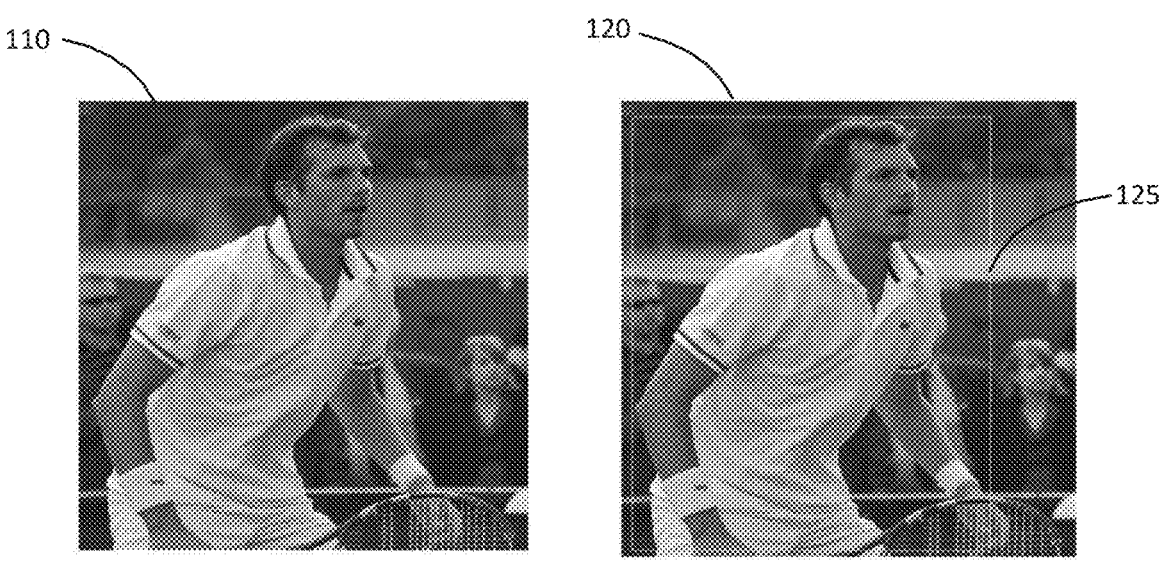
FIG. 1 illustrates an example of object detection in accordance with one aspect of computer vision tasks.

FIG. 1 illustrates an example of object detection as one type of computer vision tasks. Image 110 is an original clean image. The person in the middle of image 110 is the target object. Image 120 shows a prediction result of Faster R-CNN object detector on image 110. As shown by the bounding box 125 in image 120, the Faster R-CNN object detector can detect the target object in the clean image successfully.

One-stage detectors, also known as "single shot detectors", may predict the bounding box, object score and class score with only a single pass through the network. The one-stage detector only extracts features with one CNN and produce the result for object localization and classification right away. This difference makes one-stage detector faster but easier to be attacked. On the contrast, two-stage detector is slower, but more precious and more difficult to be attacked.

Many adversarial attack schemes have been proposed against computer vision systems including two-stage object detectors, in order to evaluate the safety of a learned computer vision system based on DNN. From the perspective of pattern form, the adversarial attacks may be classified as perturbation-based attack and patch-based attack. Since the perturbation-based attack manipulates every pixel of an image and is not feasible in physical world, while the patch-based attack uses one or more adversarial patches to attack an image and may cause potential safety risk in physical world, the present disclosure mainly focuses on the patch-based method for generating an adversarial attacked image, in order to evaluate and improve the safety of a computer vision neural network.

The patch-based attack generally modifies certain parts of image with visible changes like adversarial patches. The textures in modified parts are not constrained by the original image, which means patches can have perceptible textures. However, existing patch-based attack methods are not flexible in terms of the positions and shapes of patches, which may limit the attack performance when these properties are constrained.

Firstly, the positions of patches in existing patch-based methods are fixed. For example, DPatch method uses the up-left corner of an image, AdvPatch method takes the center of person in an image as the attack region, and UPC method puts its adversarial patches on 8 manually chosen parts of person. Secondly, the shapes of patches in the existing patch-based method are also fixed, usually rectangle. Rectangle is easy to define in digital image, but not correlated to the shape of target object. The shape and position settings of these existing patch-based methods may lead to poor attack performance in different tasks of object detection, like misclassification, position shift and disappearing, which shows that these constrained attack regions are not efficient enough for evaluating safety of a computer vision neural network.

Figure 2:
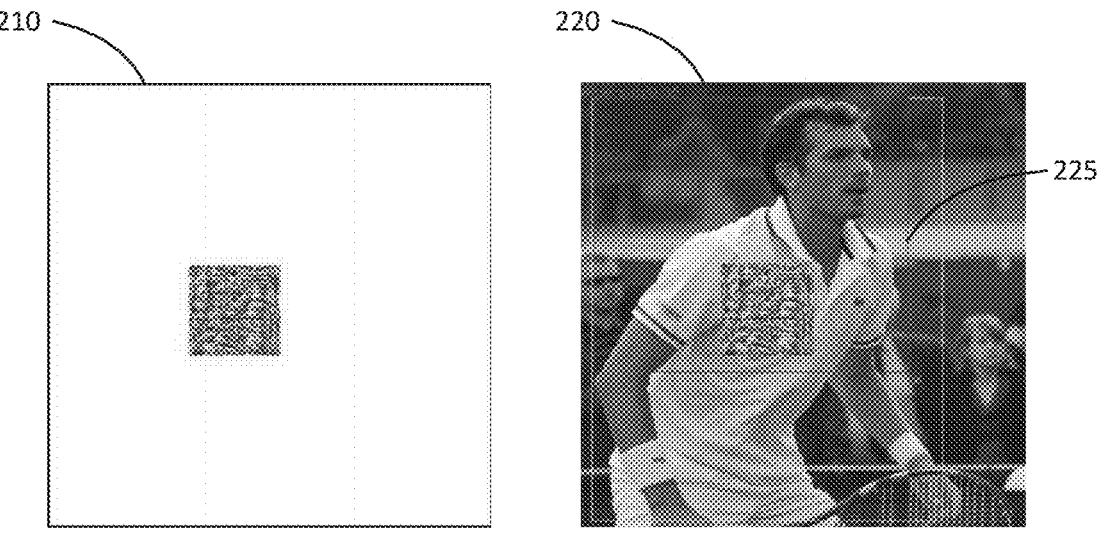
FIG. 2 illustrates an example of adversarial attack failure on object detection in accordance with one aspect of the related art.

FIG. 2 illustrates an example of adversarial attack failure on object detection in accordance with one aspect of related art. Image 210 shows an adversarial patch generated by the AdvPatch method. The position of the patch in image 210 is fixed at the center of the person. Image 220 shows an attacked image by covering the image 210 onto the clean image 110 in FIG. 1. The bounding box 225 is the prediction by a two-stage object detector of Faster R-CNN on the attacked image. As shown by the bounding box 225, the Faster R-CNN detector can detect the target object from the image attacked by AdvPatch and classify the object as "person" with a confidence of 0.66. In other words, the AdvPatch method fails to attack the image, and may not be enough to evaluate the safety of a Faster R-CNN detector. If the shapes and positions of patches can be optimized, there is still space for the attack performance to improve and the attack areas to get smaller, comparing to those methods with constrained attack positions and shapes.

Figure 3:
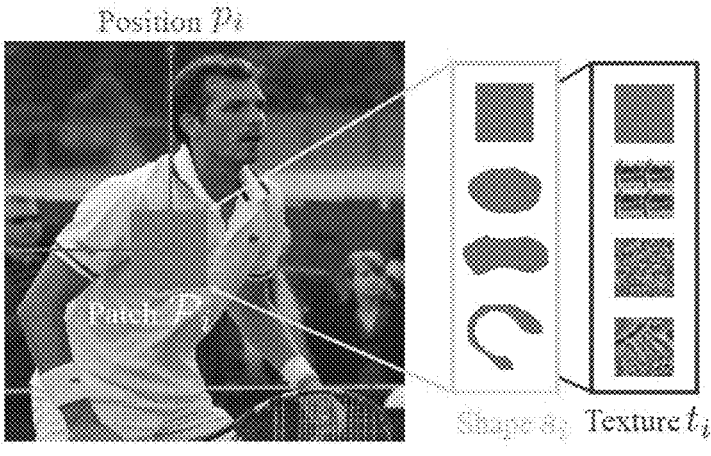
FIG. 3 illustrates an example of patches for adversarial attack on object detection in accordance with an example embodiment of the present invention.

FIG. 3 illustrates an example of patches for adversarial attack on object detection in accordance with an embodiment of the present disclosure. As shown in FIG. 3, the parameters of a patch $P_i$ may include position $p_i$, shape $s_i$, and texture $t_i$. The present disclosure not only optimizes the textures of patches, but also optimizes at least one of the positions and the shapes of patches, thereby enhancing the attack performance and efficiency on an image. The position of patches may be at anywhere in the image. In one aspect, the position may be constrained on a foreground object in the image to simulate the physical scenarios. This is mainly because in physical scenarios, attackers usually attach their patches on the surface of target object. The shape of each patch may be from a set of various predesigned shapes, such as, square, ellipse, rhombus, triangle, trapezium, and other regular/irregular shapes. In one aspect, the set of shapes may be constrained to convex shapes. In physical scenarios, the convex patches are easier to cut out from printed papers and are stronger to hold its shape when stuck onto object surface.

In an embodiment of optimizing all parameters of the positions, the shapes, and the textures for each patch, the i-th patch may be denoted as a tuple of $P_i=(s_i, p_i, t_i)$, where $s_i$, $p_i$, $t_i$ represent the shape, position, and texture of the patch respectively, as illustrated in FIG. 3. Accordingly, the optimization of the parameters of patches may be based on a following objective function:

$$\max_{\mathcal{P}_i \in \mathcal{C}} L\left(f\left(x \oplus \sum_i \mathcal{P}_i\right), y\right) - \lambda \sum_i \varphi(\mathcal{P}_i), \qquad \text{Eq. (1)}$$

$$\text{s.t.} \, \mathcal{P}_i \cap \mathcal{B} = \emptyset,$$

where f is an object detection model (such as, Faster R-CNN, Mask R-CNN, etc.), x is an original image before attacked (such as, image 110), y is ground-truth annotation of the image (such as, the bounding box 125 in image 120), $\oplus$ represents covering patches onto an image, $x \oplus \Sigma_i \mathcal{P}_i$ represents the image with modified textures at regions according to each $\mathcal{P}_i$, $L(\bullet)$ is a loss function measuring the difference between prediction of the object detection model on the attacked image $f(x \oplus \Sigma_i \mathcal{P}_i)$ and the ground-truth annotation y, $\varphi(\bullet)$ is a function to calculate the region area of every patch, and $\lambda$ is a balance parameter. A specific loss function may be dependent on a particular attack task.

In one embodiment, the patches may be constrained with $\mathcal{C}$ and $\mathcal{B}$, where $\mathcal{C}$ is the set of all convex graphics on 2D plane, and $\mathcal{B}$ is the background of the image. In other words, the patches are constrained to be convex and only exist in foreground. By maximizing $L(f(x \oplus \Sigma_i \mathcal{P}_i), y)$, the difference between the predicted output and ground truth annotation is maximized, which results in the performance decrease of detector in different attack tasks. Meanwhile, $\Sigma_i \varphi(\mathcal{P}_i)$ will penalize the region area, which is weighted by a balancing parameter $\lambda$. This encourages the optimization to get patches with smaller area while achieving satisfying performance.

However, since the parameters of position and shape are defined in a discrete space on pixel level, the loss function in equation (1) become non-differentiable to optimize. Therefore, the positions and shapes of patches cannot reach their optimal points only with traditional gradient descent methods.

Instead of directly optimizing the parameters of positions and shapes, an image may be over-segmented into a plurality of small regions, and then some of these small regions may be selected as attack regions, in accordance with one aspect of the present disclosure. In this way, the original optimization problem in equation in (1) may be reformulated into a discrete search problem.

Figure 4A:
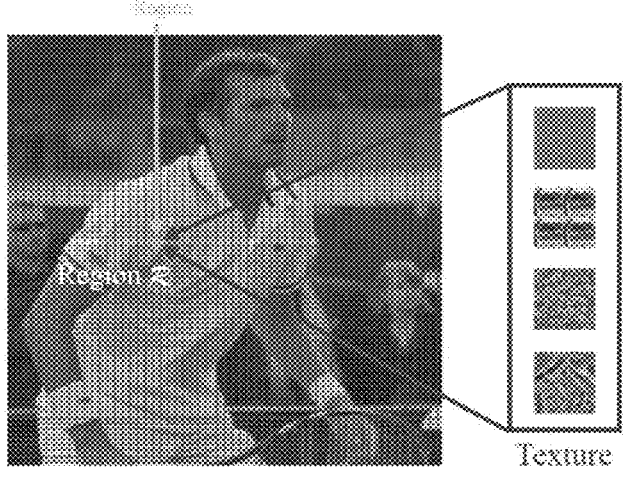
FIGS. 4A-4B illustrate an example of patches for adversarial attack on object detection in accordance with an example embodiment of the present invention.
Figure 4B:
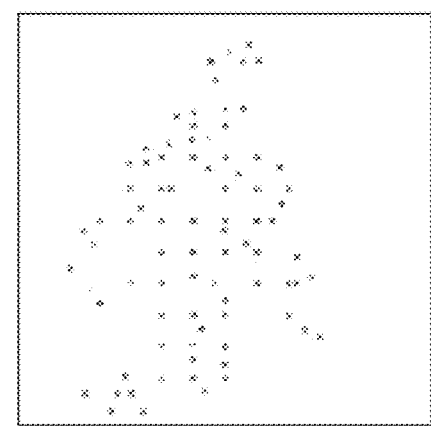

FIGS. 4A-4B illustrate an example of patches for adversarial attack on object detection in accordance with an embodiment of the present disclosure. As shown in FIG. 4A, the image is segmented into a plurality of regions by a plurality of parallel vertical lines and a plurality of parallel horizon lines. The distance between the parallel lines may be equal. The distance between the parallel lines may also be different. The segmentation may be based on a predetermined number of regions. For example, if it is predetermined to segment the image into 625 regions, the image may be segmented by 24 vertical lines and 24 horizon lines. The predetermined number may be a balance between attack performance and the calculation complexity. In other embodiments, the segmentation may be based on one or more predetermined shapes, such that the image may be segmented into different patterns. Although in some embodiments the shape of each region may be fixed and may not be optimized, a number of connected regions may constitute a patch with different shapes.

In other words, a generated patch may be comprised of several adjacent regions, and thus to some extent, the shape of a patch may be optimized by optimizing the selection of each region.

In this way, the optimization of the parameters of positions and shapes may be transformed into a discrete search problem of whether or not to select a region as a target region, such as the region $R_i$ (which means the i-th region) in FIG. 4A. In other words, a set of target regions that satisfies an attacking criterion may be selected as attack regions by discretely searching of the plurality of regions. The selected regions may be constrained to the foreground object in the image, and correspondingly the segmentation may also be performed only on the foreground object in the image. In an embodiment for solving this discrete search problem, the 0-1 values may be used to represent a selection of each region and may be taken as discrete random variables. In one embodiment, each random variable may be assumed to obey a Bernoulli distribution respectively and independently. Bernoulli distribution is a basic discrete probability distribution defined in $\{0, 1\}$. The parameters of these Bernoulli distributions may be estimated by using Natural Evolution Strategies (NES) which is widely used to estimate parameter distribution and suitable for our discrete search problem. With NES, the distribution parameters may be obtained gradually, and the regions with high probability may be selected.

Then, for the selected regions, their textures may be modified by iterative gradient back-propagation and minimizing the confidence score of the predicted bounding boxes on the attacked image covered by textures in the corresponding selected regions. The textures for each of the selected regions may also be maintained as the textures predetermined or calculated during the region selection stage. FIG. 4B illustrated an example of patches generated based on the selected regions and the modified textures. In an embodiment of only optimizing positions of adversarial patches, the texture for the selected regions may be determined based on default configuration. For example, the texture may be fixed as a texture of pseudo random noise, as shown in the top of the candidate textures in FIG. 4A.

Figure 5A:
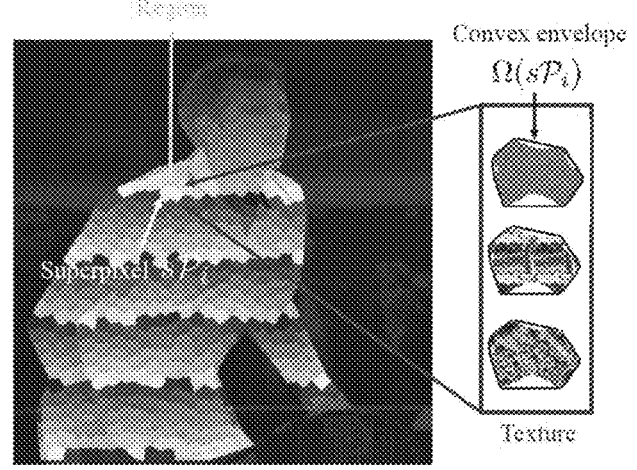
FIGS. 5A-5B illustrate an example of patches for adversarial attack on object detection in accordance with an example embodiment of the present invention.
Figure 5B:
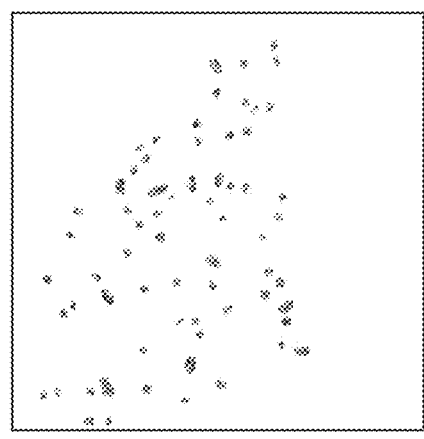

FIGS. 5A-5B illustrate another example of patches for adversarial attack on object detection in accordance with an embodiment of the present disclosure. The main difference between the patches in the example of FIGS. 5A-5B and the patches in the example of FIGS. 4A-4B is that the segmentation for the image may be based on superpixels. Superpixels may segment an image into small regions of uniform color or texture. A key property of superpixels is to preserve object boundaries, that is, all pixels in a superpixel may belong to a same object.

Since superpixels may be used as an important cue to measure the performance of object detector prediction with the degree of superpixels straddling the bounding box, an adversarial attack on superpixels can influence the predictions of the object detector.

Therefore, as shown in FIG. 5A, the image is segmented into a plurality of regions, each region being a superpixel, such as $sP_i$. The segmentation may be based on Simple Linear Iterative Clustering (SLIC) technique which is a widely used method for segmenting an image into superpixels. In order to obtain small superpixels which may result in fine-grained attack, the merging process when generating superpixels may be removed. In the example of FIG. 5A, the segmentation of superpixels is constrained on the foreground object (i.e., the person) in the image. In an embodiment with constraint of convex shapes, since the superpixels may depend on the pattern of an image and may have various shapes, an operation of getting convex envelopes for the superpixels may be performed by a function of $\Omega(sP_i)$ as shown in FIG. 5A.

Then, a set of regions may be selected as attack regions, and textures for each of the selected regions may be determined, similarly as described above with reference to FIGS. 4A and 4B. FIG. 5B illustrated an example of patches generated based on the selected regions and the determined textures. It can be seen that the shapes of the patches are not fixed due to the property of superpixels.

Figure 6:
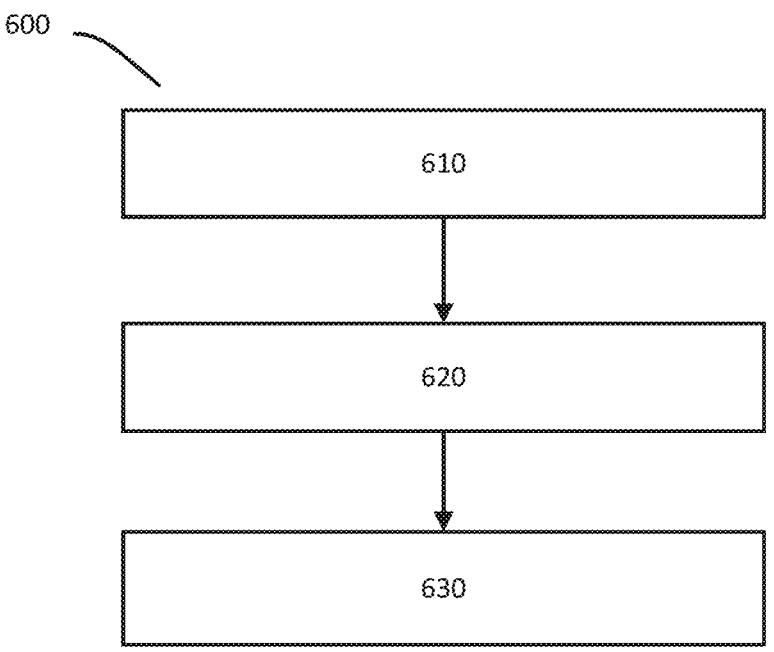
FIG. 6 illustrates a flowchart of a method for generating patches for an image in accordance with an example embodiment of the present invention.

FIG. 6 illustrates a flowchart of method 600 for generating patches for an image in accordance with an embodiment of the present disclosure. The method 600 may be implemented with reference to FIGS. 4A and 5A, and FIGS. 4B and 5B illustrates the results by performing method 600, while method 600 will not be limited to the embodiments described with reference to FIGS. 4A-4B and 5A-5B.

At block 610, method 600 may comprise segmenting an image into a plurality of regions. The image may be an original image with ground-truth labels for training and/or testing a computer vision neural network. The computer vision neural network may be used for object detection, instance segmentation, etc. The segmentation may be based on a predetermined shape or a predetermined number of regions. The predetermined shape may be a regular polygon shape, such as, triangle, square, rhomb, trapezoid, pentagon, hexagon, etc. The predetermined shape may also be an irregular polygon shape. The segmentation may be based on different patterns, which may be dependent on the characteristic of the input image. The segmentation may be constrained to a foreground object of the image.

In one embodiment, the segmenting at block 610 may comprise segmenting the image into a plurality of regions based on pixels having values within a threshold range. For example, each of the plurality of regions of the image may have uniform color or texture values, and may be referred as a superpixel. The shape of each superpixel may be different at different positions of the image based on the pattern of the image. In this embodiment, the segmenting at block 610 may further comprise changing the plurality of regions into convex shapes by getting a convex envelope for each of the plurality of regions.

At block 620, method 600 may comprise selecting a set of target regions that satisfies an attacking criterion by discretely searching of the plurality of regions. In one embodiment, a selection vector of the plurality of regions may be used to indicate whether each of the plurality of regions is to be selected into the set of target regions. The dimension of the selection vector depends on the number of the plurality of regions. Each element of the selection vector has a value of 1 or 0 indicating whether a corresponding region is to be selected or not, and is assumed to obey a Bernoulli distribution respectively and independently. Therefore, the selecting a set of target regions at block 620 may comprise optimizing a probability distribution of the selection vector by calculating a search gradient; and selecting the set of target regions based on a selection vector sampled based on the optimized probability distribution.

In other words, the selecting a set of target regions at block 620 may be based on different objective functions of an output from a computer vision neural network for an image applied by the set of patches, a ground-truth label of the original image, and a total area of the generated set of patches, in accordance with different embodiments. In the example of FIG. 4A, the optimization objective function defined in equation (1) may be reformulated as:

$$\max_{m,\{R_i\}} L\!\left(f\!\left(x \oplus \sum_i m_i R_i\right), y\right) - \lambda\varphi\!\left(\sum_i m_i R_i\right), \qquad \text{Eq. (2)}$$

where f is an object detection model, x is an original image before attacked (such as, image 110), y is ground-truth annotation of the image, $m=(m_1, m_2, \ldots, m_M)\in\{0, 1\}^M$ is the selection vector indicating whether a corresponding region $R_i$ is selected or not, M depends on the number of the segmented plurality of regions, $R_i$ represents the i-th segmented region, since after segmentation the shapes of regions are determined and positions may be represented by the corresponding element in the selection vector, only the texture is considered for $R_i$, $\oplus$ represents covering patches (based on the regions and textures) onto an image. L(•) is a loss function measuring the difference between prediction of the object detection model on the attacked image $f(x \oplus \sum_i m_i R_i)$ and the ground-truth annotation y, $\varphi(•)$ is a function to calculate the sum area of all attack regions, and $\lambda$ is a balance parameter. The constraints in equation (1) may be removed by well-designed segmentation method.

In the example of FIG. 5A, the optimization objective function defined in equation (1) may be reformulated as:

$$\max_{m,\{s\mathcal{P}_i\}} L\!\left(f\!\left(x \oplus \Omega\!\left(\sum_i m_i s\mathcal{P}_i\right)\right), y\right) - \lambda\varphi\!\left(\Omega\!\left(\sum_i m_i s\mathcal{P}_i\right)\right), \qquad \text{Eq. (3)}$$

where f is an object detection model, x is an original image before attacked (such as, image 110), y is ground-truth annotation of the image, $m=(m_1, m_2, \ldots, m_M)\in\{0, 1\}^M$ is the selection vector, M depends on the number of the segmented superpixels, $s\mathcal{P}_i$ represents the i-th superpixel, $\Omega(•)$ is a function to get convex envelopes of the superpixels, since after over-segmentation the shapes of regions depends on superpixels and positions may be represented by the corresponding element in the selection vector, only the texture is considered for $s\mathcal{P}_i$, $\oplus$ represents covering patches (based on the regions and textures) onto an image. L(•) is a loss function measuring the difference between prediction of the object detection model on the attacked image $f(x \oplus \Omega(\sum_i m_i s\mathcal{P}_i))$ and the ground-truth annotation y, $\varphi(•)$ is a function to calculate the sum area of all attack regions, and $\lambda$ is a balance parameter.

According to equations (2) and (3), the optimization of shapes, positions, and textures in equation (1) is transformed to the optimization of a selection vector (m) and textures ($\{R_i\}$ or $\{s\mathcal{P}_i\}$). In one embodiment, the selection vector may be optimized by using natural evolution strategies (NES), and the textures may be optimized by using iterative gradient ascent. For example, according to the reformulated objective function in equation (3), to optimize m with NES, a fitness function may be defined as:

$$\mathcal{F}(m, \{s\mathcal{P}_i^*\}; y) = L\!\left(f\!\left(x \oplus \Omega\!\left(\sum_i m_i s\mathcal{P}_i^*\right)\right), y\right) - \lambda\varphi\!\left(\Omega\!\left(\sum_i m_i s\mathcal{P}_i^*\right)\right), \qquad \text{Eq. (4)}$$

where $$\{s\mathcal{P}_i^*\} = \operatorname*{argmax}_{\{s\mathcal{P}_i\}}\!\left(L\!\left(f\!\left(x \oplus \Omega\!\left(\sum_i m_i s\mathcal{P}_i\right)\right), y\right)\right), \qquad \text{Eq. (5)}$$

which means $s\mathcal{P}_i^*$ is the superpixel $s\mathcal{P}_i$ with its optimal texture determined by m and y given. Here the optimal texture of each superpixel in $\{s\mathcal{P}_i^*\}$ may be denoted together as t*. t* is calculated through gradient ascent. The expected fitness under a search distribution may be defined as:

$$J(\theta_m) = \mathbb{E}_{\pi(m|\theta_m)}\mathcal{F}(m, t^*; y), \qquad \text{Eq. (6)}$$

where $\pi$ is a search distribution of m. For $m\in\{0, 1\}^M$, it is assumed to obey Bernoulli distribution $\text{Bern}(g(\theta_m))$, where $\theta_m\in R^M$ is the distribution parameter, $g(•)=\frac{1}{2}(\tanh(•)+1)$ is the function that constrains the value of probability to [0, 1]. Then, the search gradient may be calculated as:

$$\nabla_{\theta_m} J(\theta_m) = \nabla_{\theta_m} \mathbb{E}_{\pi(m|\theta_m)} \mathcal{F}(m, t^*; y) \qquad \text{Eq. (7)}$$

$$= \nabla_{\theta_m} \int \mathcal{F}(m, t^*; y) \pi(m|\theta_m) dm$$

$$= \mathbb{E}_{\pi(m|\theta_m)}[\mathcal{F}(m, t^*; y) \nabla_{\theta_m} \log \pi(m|\theta_m)]$$

$$= \mathbb{E}_{\pi(m|\theta_m)}[\mathcal{F}(m, t^*; y) \cdot 2(m - g(\theta_m))]$$

In one embodiment, an estimate of the search gradient may be obtained from samples $m^1, m^2, \ldots m^K$ as:

$$\nabla_{\theta_m} J(\theta_m) \approx \frac{1}{K} \sum_{i=1}^{K} \mathcal{F}(m^i, t^*; y) \cdot 2(m^i - g(\theta_m)) \qquad \text{Eq. (8)}$$

where K is a population size, which may be an integer from 20~50.

The loss function in equations (1)~(3) may be dependent on a particular attack task, such as, misclassification, position shift, and disappearing. The misclassification task involves with two different tasks, target attack and untarget attack. In target attack, adversarial attack should make the detector predict the target class on the target object. In untarget attack, the adversarial attack should make the detector not predict the correct class. In position shift task, adversarial attack should shift the predicted bounding box of victim object as far as possible. In disappearing task, adversarial attack should make the given object invisible to detector.

For example, for untarget misclassification task, the loss function in equation (3) may be set as:

$$L\left(f\left(x \oplus \Omega\left(\sum_i m_i s_i \mathcal{P}_i\right)\right), y\right) = \mathbb{E}_{b \sim B^*} - \zeta\left(C\left(b, x \oplus \Omega\left(\sum_i m_i s_i \mathcal{P}_i\right), y\right)\right) \qquad \text{Eq. (9)}$$

where b is the predicted bounding box, B* is the bounding boxes which can be detected as same position as ground truth bounding box, C is the classifier of detector, $C(b, x \oplus \Omega(\Sigma_i m_i s_i \mathcal{P}_i)$ the classification score predicted by the classifier on bounding box b, $\zeta(\bullet)$ outputs the classification score of ground truth category predicted by model.

For position shift task, the loss function in equation (3) may be set as:

$$L\left(f\left(x \oplus \Omega\left(\sum_i m_i s_i \mathcal{P}_i\right), y\right)\right) = \mathbb{E}_{b \sim B'} - |p^c(b) - p^c(y)|,$$

where b is predicted bounding box, B' is the set of detected bounding boxes which are closest to the ground truth object, $|p^c(b) - p^c(y)|$ is the $L_1$ norm of coordinate difference, $p^c(\bullet)$ is the central coordinates of the predicted bounding box or ground truth bounding box.

For disappearing task, the opposite value of sum of object confidence and classification scores over a certain threshold may be set as the loss function in equation (3). Object confidence may be used to measure the probability of existence of any object in bounding box. Classification score may be used to measure the probability of existence of a certain class in bounding box.

At block 630, method 600 may comprise generating a set of adversarial patches by using the set of target region. FIGS. 4B and 5B illustrate the generated adversarial patches positioned at the selected target regions with corresponding textures optimized for the selected target regions. In particular, as shown in FIG. 5B, the shapes of the adversarial patches are based on the convex envelops of the segmented superpixels. Although as shown in the figures the generated set of adversarial patches comprises a plurality of patches, it may also comprise only one adversarial patch. In other words, the number of patches in the set of adversarial patches may not be pre-determined, and may depend on an optimization result at block 620.

In one embodiment, the textures of the set of adversarial patches may be kept as the textures used while selecting the set of target regions. In another embodiment, at block 630, the generating the set of adversarial patches further comprises modifying textures for the set of adversarial patches. The textures of the set of adversarial patches may be based on default configuration. For example, the textures of the set of adversarial patches may be modified with iterative gradient ascent. The textures of the set of adversarial patches may also be selected from a texture dictionary.

Figure 9:
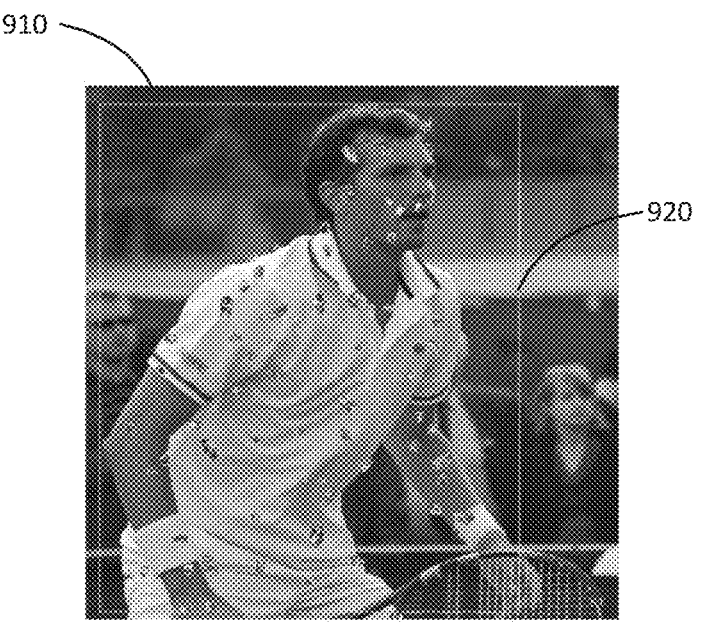
FIG. 9 illustrates an example of attacked image in accordance with an example embodiment of the present invention.

Method 600 may further comprise applying the set of adversarial patches to the original image to generate an adversarial attacked image. The set of adversarial patches may be applied to the original image by covering the set of adversarial patches onto the corresponding target regions of the original image, or replacing the corresponding target regions of the original image with the set of adversarial patches. FIG. 9 illustrates an example of attacked image in accordance with an embodiment of the present disclosure. Image 910 is an attacked image generated by covering the adversarial patches in FIG. 5B onto the original image 110 in FIG. 1. The bounding box 920 is the prediction of Faster R-CNN on the original image. However, after the image being attacked by the adversarial patches generated in accordance with an embodiment of present disclosure, the Faster R-CNN fails to detect the person in the attacked image 910. In other words, the Faster R-CNN may have potential safety issues of ignoring a person in an image if being attacked in this way.

Figure 7:
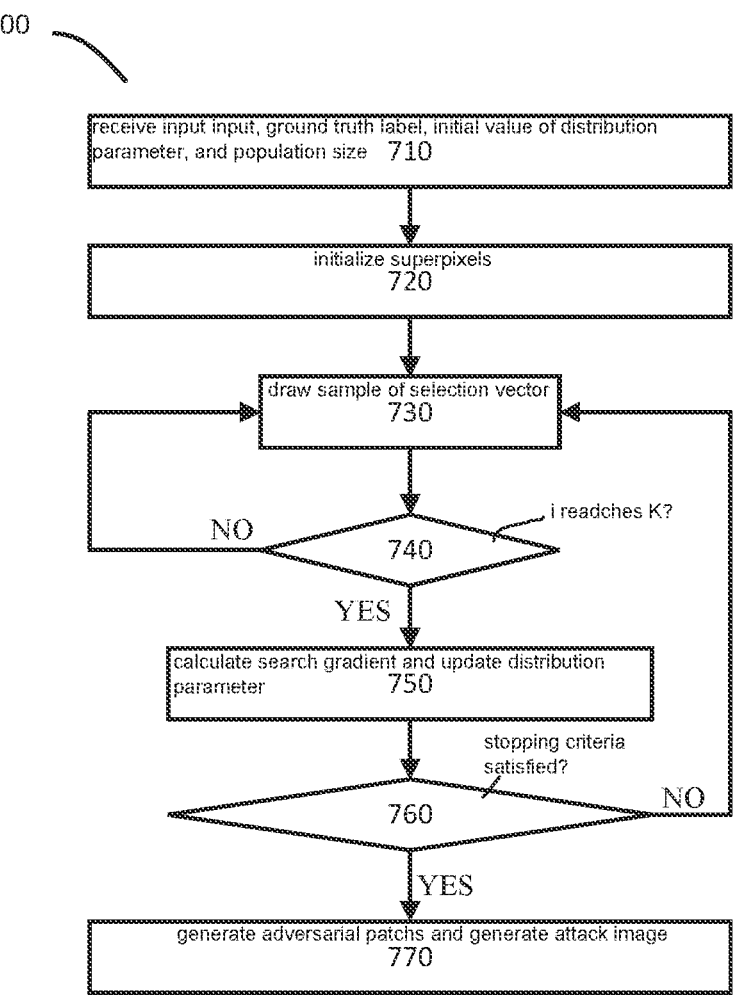
FIG. 7 illustrates a flowchart of a method for generating patches for an image in accordance with an example embodiment of the present invention.

FIG. 7 illustrates a flowchart of a method 700 for generating patches for an image in accordance with an embodiment of the present disclosure. The method 700 will be described with reference to FIG. 5A, while it should be recognized that method 700 may also be applied to other equivalent or alternative embodiment without departing from the scope of the present disclosure.

The method 700 may begin at block 710, comprising receiving an input image x, ground truth label y, initial value of distribution parameter $$\theta_m^{init},$$

and population size K. In one example, the distribution parameter may be initial parameter of Bernoulli distribution, and the population size may be configured as 30 or 40. At block 720, method 700 comprises initializing superpixels, i.e., over-segmenting the image x into superpixels, each superpixel corresponding a region of the image and having a different shape. The over-segmentation may be constrained on a foreground object of the image.

After the segmentation, method 700 may comprise, at block 730, drawing a sample of selection vector $m^i$ based on a search distribution $\pi(m|\theta_m)$, where i=1~K; calculating optimal t* based on y and $m^i$; evaluating the fitness $\mathcal{F}$ (m, t*; y) in equation (4); and calculating log-derivatives $\nabla_{\theta_m}$ log $\pi(m|\theta_m)=2(m-g(\theta_m))$ in equation (7). At block 740, whether i reaches K is determined. If not, i will be increased by 1, and method 700 may proceed back to block 730. If yes, method 700 may proceed on to block 750, where a search gradient $\nabla_{\theta_m}J(\theta_m)$ is calculated according to equation (8), and the distribution parameter is updated according to $\theta_m \leftarrow \theta_m + \eta\nabla_{\theta_m}J(\theta_m)$, wherein $\eta$ is the learning rate. Then, at block 760, whether stopping criterion is satisfied is determined. The stopping criterion may be that the fitness function reaches a predetermined threshold, the distribution parameter reaches a convergence condition, or the distribution parameter has been updated by a max number of times. If the stopping criterion is not satisfied, method 700 may proceed back to blocks 730 and 740, where another K samples of selection vector will be obtained based on the updated search distribution. If yes, method 700 may proceed on to block 770, where adversarial patches for the input image x and in turn an attacked image x' may be generated by using superpixels with high $\theta_m$ and their optimal t*.

Figure 8:
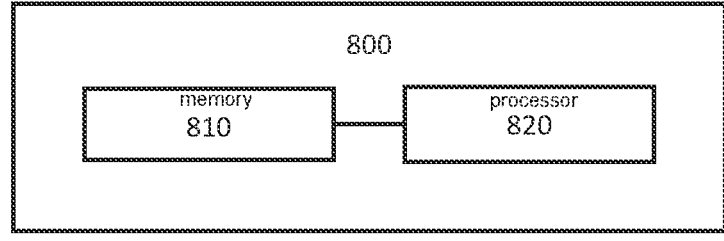
FIG. 8 illustrates an example of a hardware implementation for an apparatus in accordance with an embodiment of the present invention.

FIG. 8 illustrates an example of a hardware implementation for an apparatus 800 in accordance with an embodiment of the present disclosure. The apparatus 800 for generating adversarial patches may comprise a memory 810 and at least one processor 820. The processor 820 may be coupled to the memory 810 and configured to perform the method 600 and method 700 described above with reference to FIGS. 6 and 7. The processor 820 may be a general-purpose processor, or may also be implemented as a combination of computing devices, e.g., a combination of a DSP and a microprocessor, multiple microprocessors, one or more microprocessors in conjunction with a DSP core, or any other such configuration. The memory 810 may store the input data, output data, data generated by processor 820, and/or instructions executed by processor 820.

The various operations, models, and networks described in connection with the disclosure herein may be implemented in hardware, software executed by a processor, firmware, or any combination thereof. According an embodiment of the disclosure, a computer program product for generating adversarial patches may comprise processor executable computer code for performing the method 600 and method 700 described above with reference to FIGS. 6 and 7. According to another embodiment of the disclosure, a computer readable medium may store computer code for generating adversarial patches, the computer code when executed by a processor may cause the processor to perform the method 600 and method 700 described above with reference to FIGS. 6 and 7. Computer-readable media includes both non-transitory computer storage media and communication media including any medium that facilitates transfer of a computer program from one place to another. Any connection may be properly termed as a computer-readable medium. Other embodiments and implementations are within the scope of the disclosure.

By selecting over-segmented regions or superpixels and optimizing texture on them, the present disclosure may generate multi-distributed patches which have more flexible shapes. By optimizing positions, shapes and textures of adversarial patches instead of using fixed shape and position, the present disclosure may obtain better attack performance with same region area cost, while it can also save the attack region area when achieving same attack goal. The generated adversarial patches or attacked images may be used for evaluating safety of a computer vision neural network, and corresponding defense techniques may be applied to the computer vision neural network, thereby improving the safety of the computer vision neural network correspondingly.

The preceding description of the disclosed embodiments is provided to enable any person skilled in the art to make or use the various embodiments. Various modifications to these embodiments will be readily apparent to those skilled in the art, and the generic principles defined herein may be applied to other embodiments without departing from the scope of the various embodiments. Thus, the present invention is not intended to be limited to the embodiments shown herein but is to be accorded the widest scope consistent with the principles and novel features disclosed herein.

What is claimed is:

1. A method for generating a set of adversarial patches for an image, comprising the following steps:
   segmenting the image into a plurality of regions;
   selecting a set of target regions from the plurality of regions that satisfies an attacking criterion by discretely searching of the plurality of regions for regions satisfying the attacking criterion; and
   generating a set of adversarial patches for the image by using the set of target regions;
   wherein a shape of at least one adversarial patch in the set of adversarial patches is optimized by optimizing the selection of the set of target regions;
   wherein at least some of the adversarial patches in the set of adversarial patches have different shapes relative to one another.

2. The method of claim 1, wherein the segmenting includes:
   segmenting the image into the plurality of regions based on a polygon shape or a predetermined number of regions.

3. The method of claim 1, wherein the segmenting includes:
   segmenting the image into the plurality of regions based on pixels having values within a threshold range.

4. The method of claim 3, wherein the segmenting further includes:
   changing the plurality of regions into convex shapes by getting a convex envelope for each of the plurality of regions.

5. The method of claim 1, wherein the segmenting is constrained to a foreground object of the image.

6. The method of claim 1, wherein the selecting includes:
   optimizing a probability distribution of a selection vector of the plurality of regions by calculating a search gradient, the selection vector indicating whether each of the plurality of regions is to be selected into the set of target regions; and
   selecting the set of target regions based on a selection vector sampled based on the optimized probability distribution.

7. The method of claim 1, wherein the generating of the set of adversarial patches includes:
   modifying textures of the set of adversarial patches, wherein the modifying includes: optimizing the textures with iterative gradient ascent, or selecting the textures from a texture dictionary.

8. The method of claim 1, wherein the selecting is based on a function of an output from a computer vision neural network for the image applied by the set of adversarial patches, a ground-truth label of the image, and a total area of the set of adversarial patches.

9. The method of claim 8, wherein the computer vision neural network is used for object detection, and the function is based on a task of misclassification or position shift or disappearing during the object detection.

10. The method of claim 1, wherein the segmenting of the image is based on pixels having values with a threshold range, wherein each of the plurality of regions is a super-pixel.

11. The method of claim 1, wherein at least some of the adversarial patches are each constituted by several adjacent regions of the set of target regions.

12. The method of claim 1, wherein each of the different shapes is non-rectangular.

13. An apparatus for generating a set of adversarial patches for an image, comprising:

a memory; and at least one processor coupled to the memory and configured to generating a set of adversarial patches for an image, the at least one processor configured to:

segment the image into a plurality of regions;

select a set of target regions from the plurality of regions that satisfies an attacking criterion by discretely searching of the plurality of regions for regions satisfying the attacking criterion; and generate a set of adversarial patches for the image by using the set of target regions;

wherein a shape of at least one adversarial patch in the set of adversarial patches is optimized by optimizing the selection of the set of target regions;

wherein at least some of the adversarial patches in the set of adversarial patches have different shapes relative to one another.

14. A non-transitory computer readable medium on which is stored storing computer code for generating a set of adversarial patches for an image, the computer code when executed by a processor, causing the processor to perform the following steps:

segmenting the image into a plurality of regions;

selecting a set of target regions from the plurality of regions that satisfies an attacking criterion by discretely searching of the plurality of regions for regions satisfying the attacking criterion; and generating a set of adversarial patches for the image by using the set of target regions;

wherein a shape of at least one adversarial patch in the set of adversarial patches is optimized by optimizing the selection of the set of target regions;

wherein at least some of the adversarial patches in the set of adversarial patches have different shapes relative to one another.

* * * * *